(12) United States Patent
Matsa et al.

(10) Patent No.: US 8,301,993 B2
(45) Date of Patent: Oct. 30, 2012

(54) MAPPING RAW SPREADSHEET DATA INTO GRAPHS ON ARBITRARY SUBSETS OF THE DATA

(75) Inventors: Moshe E. Matsa, Cambridge, MA (US); Eric Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1418 days.

(21) Appl. No.: 11/672,545

(22) Filed: Feb. 8, 2007

(65) Prior Publication Data
US 2008/0195928 A1    Aug. 14, 2008

(51) Int. Cl.
*G06F 17/00*    (2006.01)
(52) U.S. Cl. .......................... 715/212; 715/215; 345/440
(58) Field of Classification Search .................. 715/209, 715/212–220, 227–228, 234, 243, 273, 760, 715/764–765, 853; 345/440, 1, 440.2; 705/7.11, 705/37; 709/224
See application file for complete search history.

(56) References Cited

U.S. PATENT DOCUMENTS

| 5,461,708 | A | * | 10/1995 | Kahn ............................ 345/440 |
| 6,057,837 | A | | 5/2000 | Hatakeda et al. |
| 6,529,217 | B1 | | 3/2003 | Maguire, III et al. |
| 6,906,717 | B2 | | 6/2005 | Couckuyt et al. |
| 2006/0026499 | A1 | | 2/2006 | Weddle |

FOREIGN PATENT DOCUMENTS
CN    1545665 A    11/2004

OTHER PUBLICATIONS

Peltier, Jon, "Create Multiple Combination Charts in Excel," Computor Companion, The Practical Guide to Using Computers Effectively web site article, archive date Dec. 1, 2005, downloaded from Wayback Machine, <http://web.archive.org/web/20051201115224/http://www.computorcompanion.com/LPMArticle.asp?ID=211>, 13 total pages labeled 1-13.*

Su et al., "PetroPlot, a plotting and data management tool set for Microsoft Excel," (c) 1999-2002, last updated May 10, 2002, downloaded from <http://www.petdbWeb/search/PetroPlot/petroplot.htm>, 95 total pages labeled 1-95.*

Su et al., "PetroPlot, A plotting and data management tool set for Microsoft Excel," (c) Mar. 26, 2003, Technical Brief, vol. 4, No. 3, American Geophysical Union, pp. 1-14.*

\* cited by examiner

*Primary Examiner* — Cesar Paula
*Assistant Examiner* — James H Blackwell
(74) *Attorney, Agent, or Firm* — Jose Gutman; Fleit Gibbons Gutman Bongini & Bianco PL (57) ABSTRACT

Disclosed are a method, information processing system, and computer readable medium for graphically representing data in a spreadsheet. The method includes displaying a set of tabular data visually arranged at least in rows and columns. A user selection of a first dimension and second dimension of data in a series of a first column and second column, respectively, in the set of tabular data is received. A user selection of at least one series identifier in a third column is received. Each distinct set of data entries within the third column is found automatically and without manual intervention. A graphical representation of the user selected tabular data is automatically created without manual intervention. The graphical representation is based on the selected first dimension of data in the series, the selected second dimension of data in the series, and the selected series identifier.

20 Claims, 6 Drawing Sheets

FIG. 1

| TEST DATE | MACHINE NAME | MACHINE SPEED | PARSER NAME | TOOL TRIALS | BYTES | SECONDS | ... |
|---|---|---|---|---|---|---|---|
| 10-30-2001 | MACHINE 1 | 1000 | PARSER C | 10 | 46 | .00200 | ... |
| 10-30-2001 | MACHINE 1 | 1000 | PARSER A | 10 | 1064 | .00300 | ... |
| 10-30-2001 | MACHINE1 | 1000 | PARSER B | 10 | 1064 | .00350 | ... |
| 10-30-2001 | MACHINE 1 | 1000 | PARSER A | 10 | 46 | .00130 | ... |
| 10-30-2001 | MACHINE 1 | 1000 | PARSER B | 10 | 1972 | .00500 | ... |
| 10-30-2001 | MACHINE 1 | 1000 | PARSER C | 10 | 46 | .00140 | ... |
| 10-30-2001 | MACHINE 1 | 1000 | PARSER C | 10 | 1064 | .00410 | ... |
| 10-30-2001 | MACHINE 1 | 1000 | PARSER B | 10 | 1972 | .00624 | ... |
| ... | ... | ... | ... | ... | ... | ... | ... |
| 10-30-2001 | MACHINE 1 | 1000 | ... | ... | 1972 | .00570 | ... |
| ... | ... | ... | ... | ... | ... | ... | ... |

| BYTES | PARSER A | PARSER B | PARSER C |
|---|---|---|---|
| 46 | .00130 | .00140 | .00200 |
| 46 | ... | ... | ... |
| 46 | ... | ... | ... |
| ... | ... | ... | ... |
| ... | ... | ... | ... |
| ... | ... | ... | ... |
| 1064 | .0030 | .0350 | .0410 |
| 1064 | ... | ... | ... |
| 1064 | ... | ... | ... |
| ... | ... | ... | ... |
| ... | ... | ... | ... |
| ... | ... | ... | ... |
| 1972 | .00500 | .00570 | .00624 |
| 1972 | ... | ... | ... |
| 1972 | ... | ... | ... |
| ... | ... | ... | ... |
| ... | ... | ... | ... |
| ... | ... | ... | ... |
| ... | ... | ... | ... |
| ... | ... | ... | ... |

MAPPING RAW SPREADSHEET DATA INTO GRAPHS ON ARBITRARY SUBSETS OF THE DATA

FIELD OF THE INVENTION

The present invention generally relates to the field of data spreadsheet applications, and more particularly relates to graphically representing data in a spreadsheet.

BACKGROUND OF THE INVENTION

Current spreadsheet applications are often used to create graphs/charts of data in a spreadsheet. However, a user often is required to organize the data into graph-ready formats. For example, the data needs to be organized in a relational way that allows a user to select the data to be included on the x-axis and y-axis of a graph for a particular data series. If a user wants to include multiple data series in a graph, the user needs to separately select the data series and the data to be plotted on the x-axis and y-axis. Each of the data series are then added separately to the graph. For very large spreadsheets this process becomes very tedious and time consuming. Furthermore, many of the current spreadsheet application require the remapping of data within spreadsheets or the use of a pivot table feature for cross tabulation of spreadsheet data. This process can also be very inefficient and time consuming for large spreadsheets.

Therefore a need exists to overcome the problems with the prior art as discussed above.

SUMMARY OF THE INVENTION

Briefly, in accordance with the present invention, disclosed are a method, information processing system, and computer readable medium for graphically representing data in a spreadsheet. The method includes displaying a set of tabular data visually arranged at least in rows and columns. A user selection of a first dimension of data in a series is received. The first dimension of data is visually included in a first column in the set of tabular data. A user selection of a second dimension of data in the series is also received. The second dimension of data is visually included in a second column in the set of tabular data. A user selection of at least one series identifier is received. The at least one series identifier is visually included in a third column in the set of tabular data. Each distinct set of data entries within the third column is automatically found without manual intervention. Wherein each distinct set of data entries identifies a separate data series in the tabular data.

A graphical representation of the user selected tabular data is also automatically created without manual intervention. The graphical representation is based on the selected first dimension of data in the series, the selected second dimension of data in the series, and the selected series identifier. The graphical representation, for each separate data series, includes a data point at an intersection of the first dimension of data and the second dimension of data, data values of the first dimension of data and the second dimension of data. The data values are found at respective first and second intersections of a row in the visually arranged tabular data intersecting with the first column and the second column. The selected series identifier is found at the intersection of the row and the third column.

In another embodiment of the present invention, an information processing system is disclosed. The information processing system comprises a memory and a processor that is communicatively coupled to the memory. The information processing system also includes a spreadsheet module and a spreadsheet user interface that is communicatively coupled to the spreadsheet module. The spreadsheet user interface is for displaying a set of tabular data visually arranged at least in rows and columns. A user selection of a first dimension of data in a series is received. The first dimension of data is visually included in a first column in the set of tabular data. A user selection of a second dimension of data in the series is also received. The second dimension of data is visually included in a second column in the set of tabular data. A user selection of at least one series identifier is received. The at least one series identifier is visually included in a third column in the set of tabular data. Each distinct set of data entries within the third column is automatically found without manual intervention. Wherein each distinct set of data entries identifies a separate data series in the tabular data.

A graphical representation of the user selected tabular data is also automatically created without manual intervention. The graphical representation is based on the selected first dimension of data in the series, the selected second dimension of data in the series, and the selected series identifier. The graphical representation, for each separate data series, includes a data point at an intersection of the first dimension of data and the second dimension of data, data values of the first dimension of data and the second dimension of data. The data values are found at respective first and second intersections of a row in the visually arranged tabular data intersecting with the first column and the second column. The selected series identifier is found at the intersection of the row and the third column.

In yet another embodiment, a computer readable medium for graphically representing data in a spreadsheet is disclosed. The computer readable medium includes instructions for displaying a set of tabular data visually arranged at least in rows and columns. A user selection of a first dimension of data in a series is received. The first dimension of data is visually included in a first column in the set of tabular data. A user selection of a second dimension of data in the series is also received. The second dimension of data is visually included in a second column in the set of tabular data. A user selection of at least one series identifier is received. The at least one series identifier is visually included in a third column in the set of tabular data. Each distinct set of data entries within the third column is automatically found without manual intervention. Wherein each distinct set of data entries identifies a separate data series in the tabular data.

A graphical representation of the user selected tabular data is also automatically created without manual intervention. The graphical representation is based on the selected first dimension of data in the series, the selected second dimension of data in the series, and the selected series identifier. The graphical representation, for each separate data series, includes a data point at an intersection of the first dimension of data and the second dimension of data, data values of the first dimension of data and the second dimension of data. The data values are found at respective first and second intersections of a row in the visually arranged tabular data intersecting with the first column and the second column. The selected series identifier is found at the intersection of the row and the third column.

One advantage of the present invention is that a user is no longer required to organize data in a spreadsheet so that all the data associated with a particular data series is grouped together. The data within a spreadsheet can be left in a non-series-relational format. Another advantage of the present invention is that a user can select one or more columns to define an x-axis, y-axis, and data series identifier and the spreadsheet application automatically maps the relevant data associated with the selected columns into a graph. In other words, even though the data in the spreadsheet is not necessarily in a series relationship with data in adjacent cells, the spreadsheet application can create a graph that includes data plots for multiple data series based on a user's selection of columns for the x-axis, y-axis, and data series identifier.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The terms "program", "software application", and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Information Processing System

Figure 1:
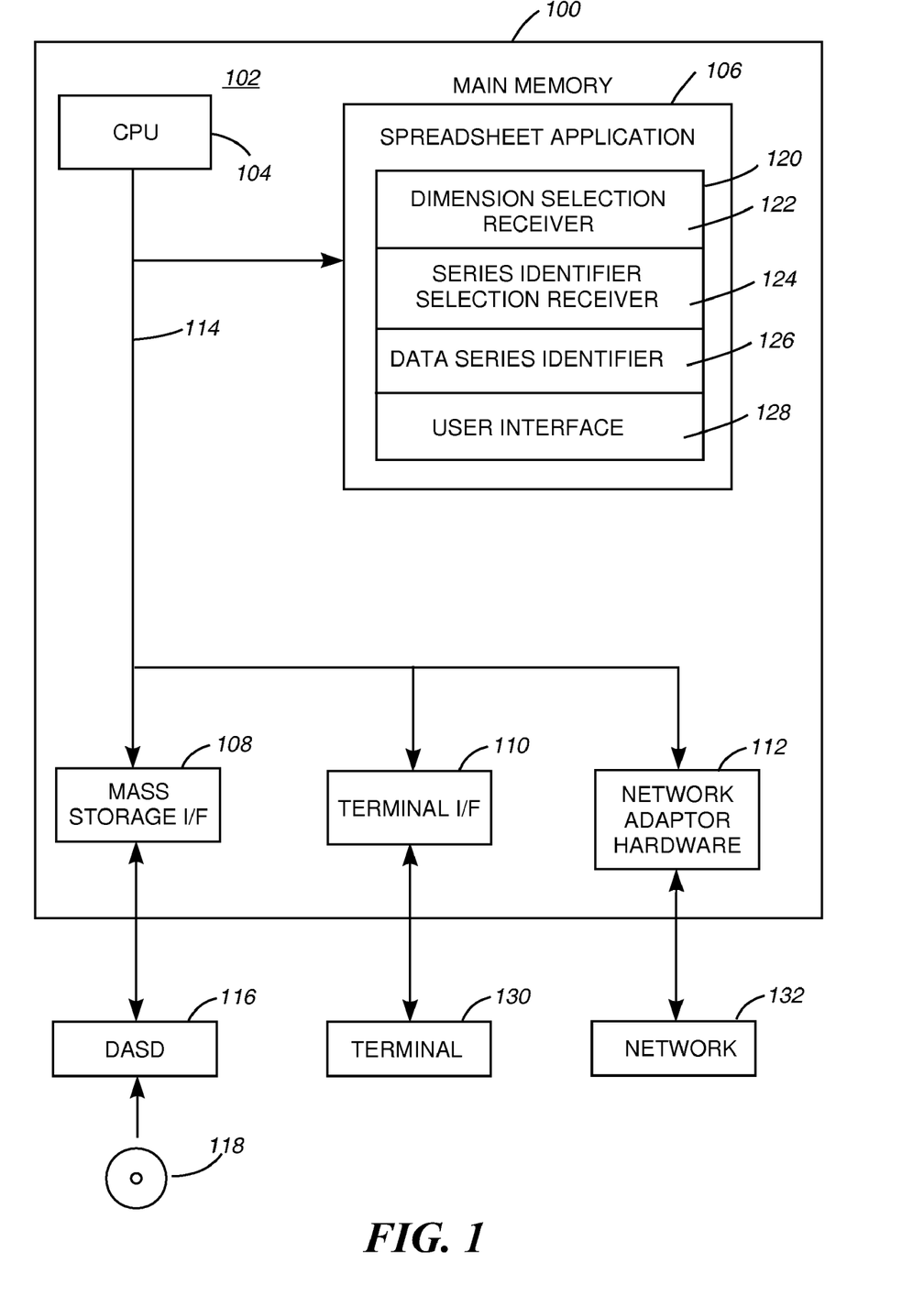
FIG. 1 is a diagram illustrating an information processing system according to an embodiment of the present invention.

According to an embodiment of the present invention, as shown in FIG. 1, an exemplary information processing system 100 is shown. The information processing system 100 is based upon a suitably configured processing system adapted to implement one or more embodiments of the present invention. Any suitably configured processing system is similarly able to be used as the information processing system 100 by embodiments of the present invention, for example, a personal computer, workstation, or the like. The information processing system 100 includes a computer 102. The computer 102 has a processor 104 that is connected to a main memory 106, mass storage interface 108, terminal interface 110, and network adapter hardware 112. A system bus 114 interconnects these system components. The mass storage interface 108 is used to connect mass storage devices, such as data storage device 116, to the information processing system 100 system. One specific type of data storage device is a computer readable medium such as a CD/DVD drive, which may be used to store data to and read data from a CD/DVD 118 or floppy diskette (not shown). Another type of data storage device is a data storage device configured to support, for example, NTFS type file system operations.

The main memory 106, in one embodiment, comprises a spreadsheet application 120 for creating spreadsheets and graphs/charts to graphically represent data within the spreadsheets. The spreadsheet application 120, in one embodiment, includes a user interface 128 that allows a user to interact with the spreadsheet application 120. For example, a user can, among other things, enter/import data into a spreadsheet and select a range of the data to be processed by the spreadsheet application 120. In one embodiment, the data does have to be organized in a series-relational format where rows related to a data series are grouped together.

The spreadsheet application 120, in one embodiment, also includes a dimension selection receiver 122. The dimension selection receiver 122 receives a user's selection for dimensions of data such as an x-axis, y-axis, and/or a z-axis to be plotted on a graph. For example, through the user interface 128, a user can select one or more column identifiers that can be used when creating the x-axis, y-axis, and/or a z-axis of a graph. A column identifier, in one embodiment, is a name associated with a column and describes the type of data within that column. For example, a column identifier can be but is not limited to the top most entry in a column. The data within a column(s) associated with the selected column identifiers(s) is used to plot data points on the graph.

The spreadsheet application 120 also includes a series identifier selection receiver 124. The series identifier selection receiver 124, in one embodiment, receives a user's selection of one or more series identifiers to be used when creating a graph based on the dimension selections made by the user. For example, a user can use the user interface 128 to select one or more columns of a spreadsheet to define the data series to be associated with a graph. The spreadsheet application 120, in one embodiment, also includes a data series identifier 126. The data series identifier 126, in one embodiment, identifies each distinct set of data entries within the one or more columns selected by the user to define the series. This allows a user to not have to manually organize the data within a spreadsheet for graphing/charting purposes. In other words, the user is not required to organize the data 200 in the spreadsheet 202 in a series-relational form. Each of the distinct sets of data entries identified by the data series identifier 126 is flagged as a separate data series.

In one embodiment, the spreadsheet application 120 creates a graph including data points on the x, y, and/or z axis for each of the identified distinct sets of data entries (i.e. data series). For example, each of the data entries within a data series (i.e. distinct set of data entries) is associated with a row in the spreadsheet 202. Each of these rows is intersected by the one or more columns selected by the user to be associated with each dimension of a graph. A data point is included on the graph that corresponds to the data entries located at the intersection of the row and columns associated with the dimensions of the graph. The graph is discussed in greater detail below. Although, shown residing within the spreadsheet application, the dimension selection receiver 122, series identifier selection receiver 124, data series identifier 126, and user interface 128, can reside outside of the spreadsheet application 120 as separate pluggable modules.

One advantage of the present invention is that raw data (e.g., data that is not necessarily in a series relationship with data in adjacent cells) can be imported/entered into a spreadsheet and graphed without a user having to reorganize the data into a conventional graph-ready format. Once the raw data 200 is entered/imported into the spreadsheet 202 a user only has to define one or more dimensions, series identifiers for the graph, and optional filters for the spreadsheet application 120 to be able to create a graph with data points for multiple data series.

Although illustrated as concurrently resident in the main memory 106, it is clear that respective components of the main memory 106 are not required to be completely resident in the main memory 106 at all times or even at the same time. In one embodiment, the information processing system 100 utilizes conventional virtual addressing mechanisms to allow programs to behave as if they have access to a large, single storage entity, referred to herein as a computer system memory, instead of access to multiple, smaller storage entities such as the main memory 106 and data storage device 116. Note that the term "computer system memory" is used herein to generically refer to the entire virtual memory of the information processing system 100.

Although only one CPU 104 is illustrated for computer 102, computer systems with multiple CPUs can be used equally effectively. Embodiments of the present invention further incorporate interfaces that each include separate, fully programmed microprocessors that are used to off-load processing from the CPU 104. Terminal interface 110 is used to directly connect one or more terminals 130 to computer 102 to provide a user interface to the computer 102. These terminals 130, which are able to be non-intelligent or fully programmable workstations, are used to allow system administrators and users to communicate with the information processing system 100. The terminal 130 is also able to consist of user interface and peripheral devices that are connected to computer 102 and controlled by terminal interface hardware included in the terminal I/F 110 that includes video adapters and interfaces for keyboards, pointing devices, and the like.

An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 100. The network adapter hardware 112 is used to provide an interface to a network (not shown). Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via floppy disk, e.g. CD 118 and its equivalents, floppy disk (not shown), or other form of recordable media, or via any type of electronic transmission mechanism.

Exemplary Data

Figure 2:
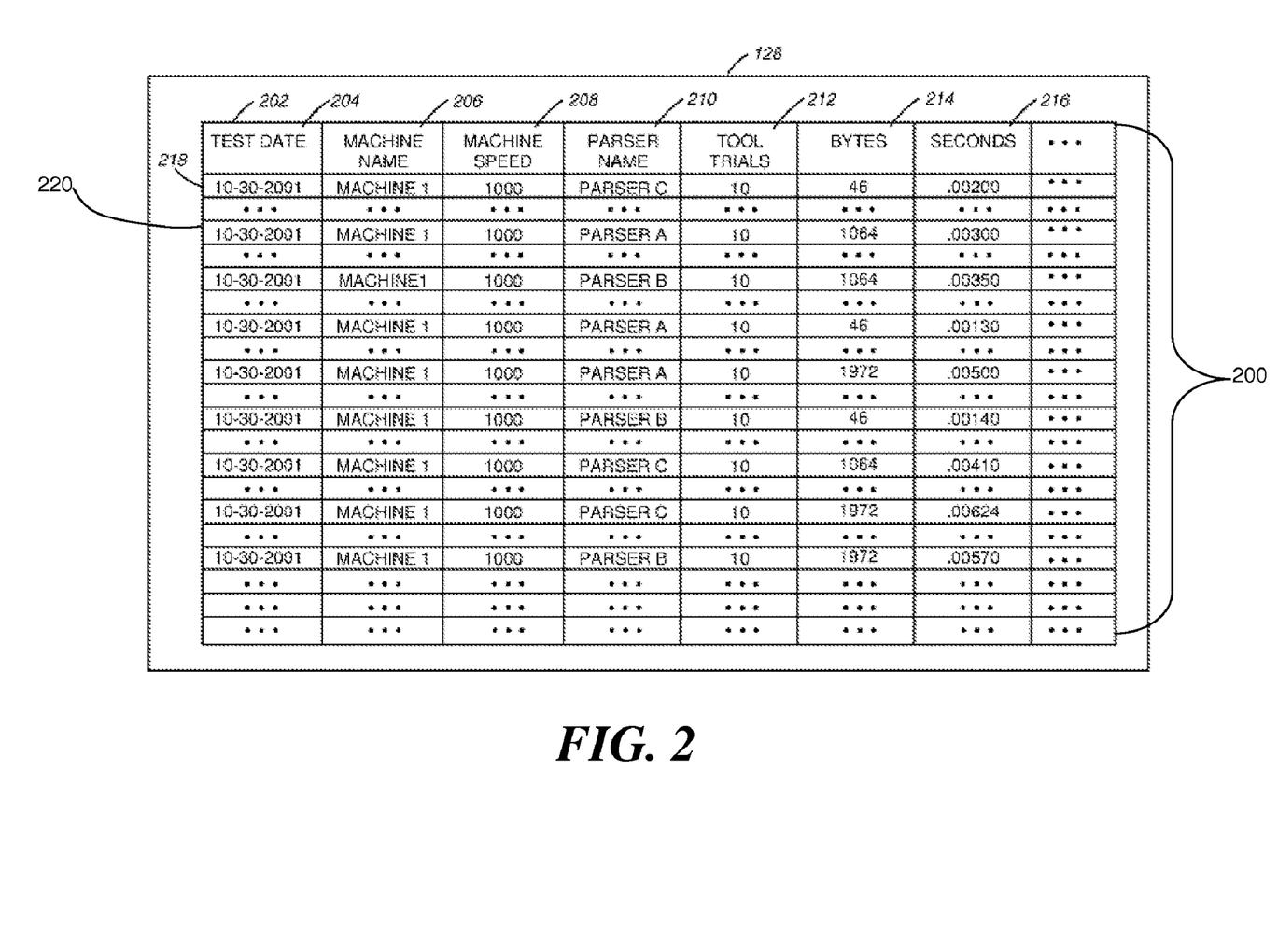
FIG. 2 illustrates exemplary tabular data according to an embodiment of the present invention.

FIG. 2 illustrates exemplary data 200 in a spreadsheet 202. In one embodiment, the spreadsheet 202 is displayed to a user through the user interface 128. A user can import the data from a file or manually enter the data into the spreadsheet 202. It should be noted that the spreadsheet 202 is used only as an illustration and is not limiting. For example, the spreadsheet 202 can comprise additional columns and rows. The data 200 is associated with various test runs of a parser such as an XML parser. The data 200, in one embodiment, is laid out in rows and columns of the spreadsheet 202. In one embodiment, the cells within a column have a common data type. For example, the spreadsheet 202 includes a first column 204 comprising data associated with the date that a test was performed on a particular parser. A second column 206 comprises data associated with the name of the machine that a test was performed on. A third column 208 includes data associated with the speed of the machine (e.g. 1000 MHz) that the test was performed on. A fourth column 210 includes entries comprising the name of the parser tested. A fifth column 212 includes entries comprising the number of test trials performed on a particular parser. A sixth column 214 comprises entries including the number of bytes in a file used in each test trial. A seventh column 216 includes entries comprising the average amount of time in seconds that the tested parser took to parse through the number of bytes.

In one embodiment, the data 200 is raw data, that is, the data 200 is arranged in the spreadsheet 200 in a raw state. In other words, the cells where the rows and columns of the spreadsheet 202 intersect are not necessarily in any type of series relationship between adjacent cells. The columns and rows of the spreadsheet 202 do not have to be arranged against each other in a data series relationship so that a user can easily select a range of data to be plotted on an x-axis and y-axis of a graph. As can be seen in FIG. 2, the columns and rows of the spreadsheet 202 are not arranged according to any particular data series relationship. Each row of the spreadsheet 202 includes data that has a relationship with a particular event, object, and the like. For example, the first row 218 is associated with a test performed on Parser C, the second row 220 is associated with a test performed on Parser A, and so on.

One advantage of the present invention is that a user can leave the spreadsheet in a format as illustrated in FIG. 2. In other words, for the spreadsheet application 120 to graph, for example, how long it took a particular parser to parse through a certain number of bytes, a user does not have to arrange the spreadsheet 202 so that all of the data for the parser is grouped together. The present invention allows for the data in the spreadsheet to be left in a format where data in a cell is not in a series relationship with data in an adjacent cell while still being able to produce the requested graphs/charts for particular series of data.

Exemplary User Interface

Figure 3:
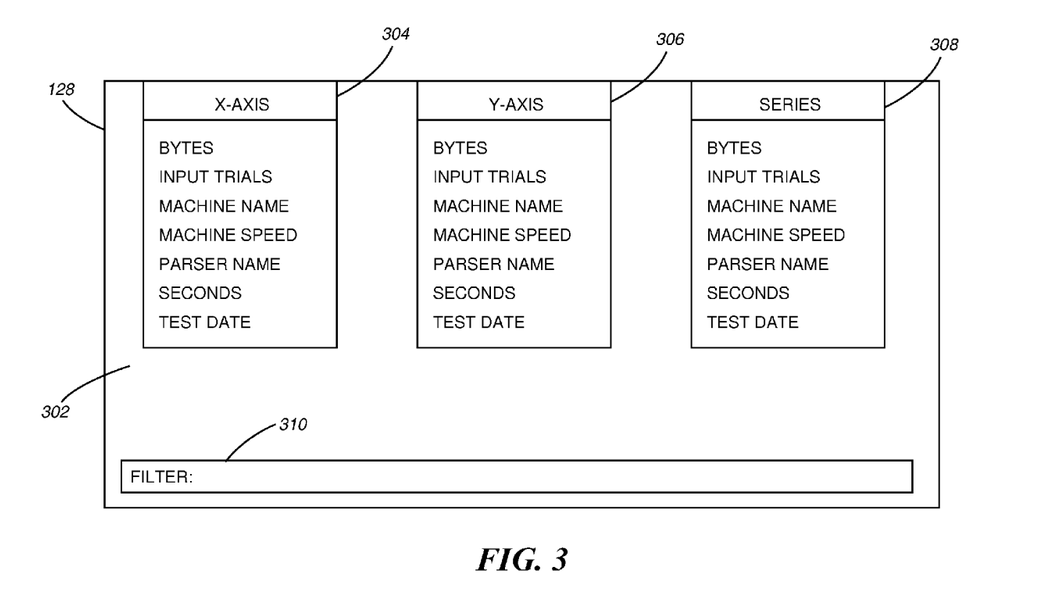
FIG. 3 is an exemplary user interface, according to an embodiment of the present invention.

FIG. 3 illustrates an exemplary user interface 128 that allows a user to interact with the spreadsheet application 120. The user interface 128, in one embodiment, includes a display area 302 for displaying items such as the spreadsheet 202 (FIG. 2), menus, and the like. In one embodiment, the user interface 128 comprises a first dimension selection area 304, a second dimension selection area 306, and a series identifier selection area 308. The first dimension selection area 304, in one embodiment, provides a user with a list of column identifiers that the user can choose to be the first dimension (e.g., an x-axis) of a graph. The second dimension selection area 306, in one embodiment, provides a user with a list of column identifiers that the user can choose to be the second dimension (e.g., a y-axis) of a graph. The series identifier selection area 308 provides a user with a list of column identifiers that the user can choose to define the data series for a graph.

The column identifiers, in one embodiment, identify the type of data within a column. For example, the column identifier can be, but is not limited to, the top-most entry in the column, which is commonly the column name. In one embodiment, each column identifier within a range of cells selected by the user is displayed in each of the selection areas 304, 306, 308. In one embodiment, instead of a list of column identifiers being shown, the user can input (e.g., type) the name(s) of the column into an input box (not shown) associated with the first dimension, second dimension, and series of a graph.

Furthermore, in another embodiment, the user can enter an expression in a selection area 304, 306, 308 for selecting the x-axis, y-axis, and series identifier. For example, for the x-axis, the user can enter "=Bytes/Seconds", which results in a measure of throughput. In this example, the user does not have to select the column "Bytes" and column "Seconds" nor does a separate column "Bytes/Seconds" need to be included on the spreadsheet 202. The user can enter the expression above and the spreadsheet application 120 generates the required data for the graph. It should be noted that expression discussed above is only used as an example and does not limit the present invention to such an expression. Also, the present invention is not limited to a two-dimensional x-y graph. The present invention is also applicable to a three dimensional x-y-z graph.

As an illustrative example, a user can select for the x-axis "Bytes", for the y-axis "Seconds", and for the series "Parser Name". In one embodiment, columns can be combined to produce axes of the series identifier. For example, instead of the series being only the name of the parser, it can be any regular expression over the columns such as the name of the parser concatenated with the version number of the parser and the like. The user can also apply optional filters to the data. For example, a user can enter filter expressions in a filter input box 310 or predefined filters can be selected from a filter list (not shown). For example, a user can enter an expression, which can include column names, or select a predefined filter that only allows rows with 1972 Bytes or less to be passed on to the graphing function of the spreadsheet application 120.

Once the first dimension, second dimension, series identifier, and optional filters have been selected, the data series identifier 126 identifies each distinct set of data entries in the column(s) associated with the selected series identifier(s). For example, in the above example, the user selected "Parser Name" as the series identifier. The column 210 associated with the column identifier "Parser Name" includes three different parser names, Parser A, Parser B, Parser C. With conventional spreadsheet applications, a user has to arrange the spreadsheet to group all of the rows including a common parser name together. In other words, all of the rows including Parser A are grouped together, all of the rows including Parser B are grouped together, and all of the rows including Parser C are grouped together. If the user wants to create a graph including multiple data series then the user is required to select the x-axis and y-axis for each data series, i.e., Parser A, Parser B, Parser C and separately add each data series to the graph.

Figure 4:
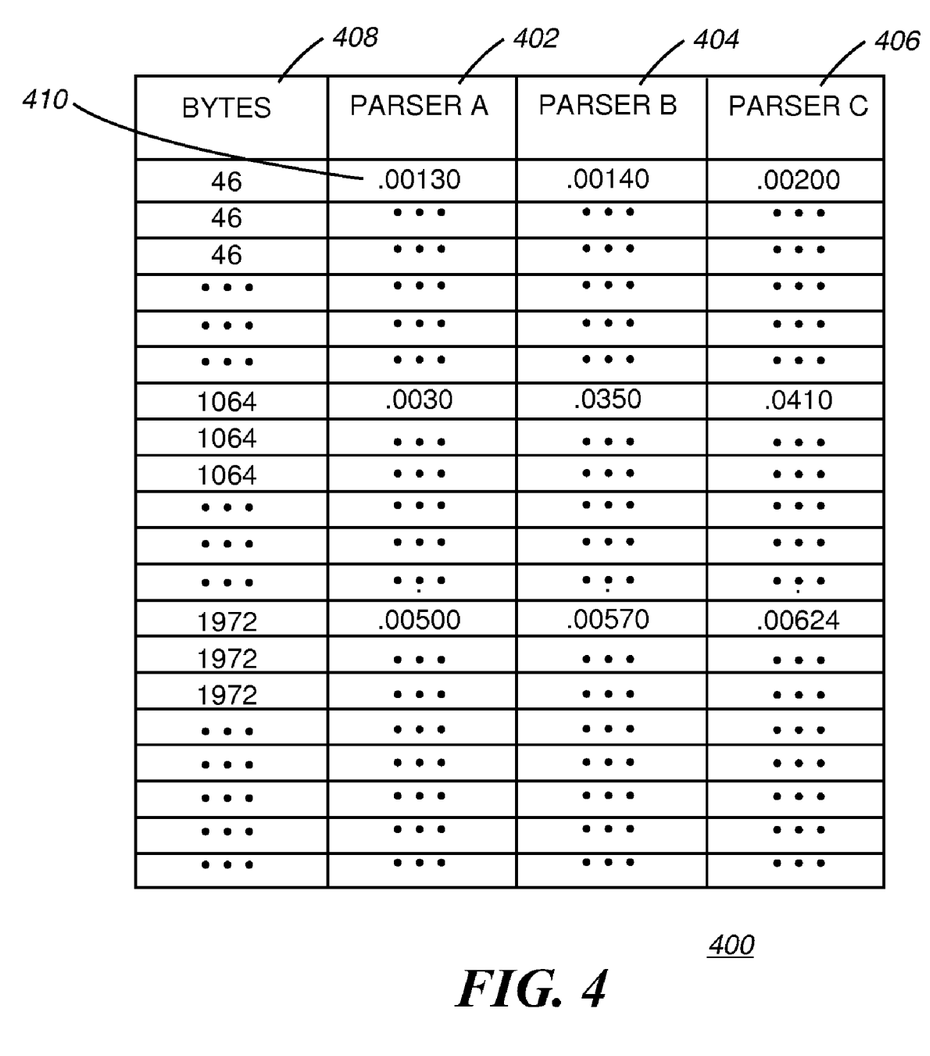
FIG. 4 illustrates the exemplary tabular data of FIG. 2 after a mapping method is performed on the tabular data according to an embodiment of the present invention.

However, the data series identifier 126 automatically identifies each distinct set of entries (series) within the column or columns selected as the series identifier. For example, FIG. 4 shows a mapping of the data 200 in the spreadsheet 202 according to the user selection of the first dimension, second dimension, series identifier, and optional filters. The mapping 400 includes the different data series Parser A 402, Parser B 404, Parser C 406 identified by the data series identifier 126 in the "Parser Name" column 210 selected by the user for the series identifier. FIG. 4 shows for each data series ("Parser Name" in this example) the number of bytes 408 used to test the parser and the number of seconds 410 it took the parser to parse through the bytes. In one embodiment, FIG. 4 can also be a spreadsheet displayed to a user through the user interface 128 so that the user can see the information that is to be graphed.

Exemplary Graph

Figure 5:
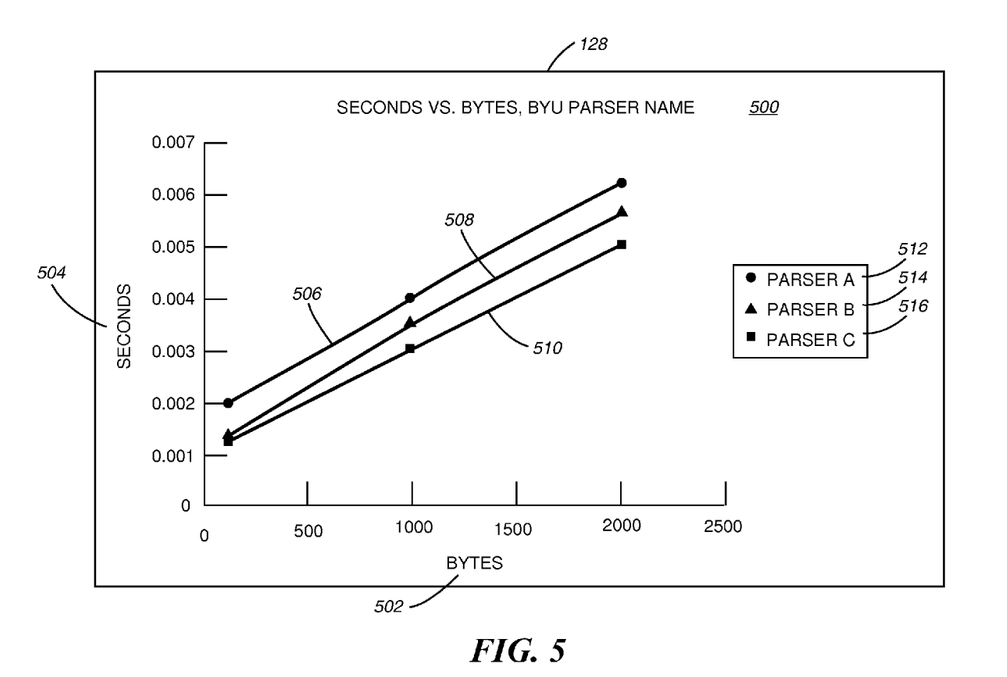
FIG. 5 illustrates an exemplary graph comprising data plots for each data series in the exemplary tabular data of FIG. 4 according to an embodiment of the present invention.

FIG. 5 shows an exemplary scatter-plot graph 500 of the data in FIG. 2 based on the user's selection of the x-axis, y-axis, and series identifier, as shown in FIG. 4. It should be noted that the present invention is not limited to creating a scatter-plot graph, as other graph types can also be created. As can be seen, the x-axis 502 comprises "Bytes" and the y-axis 504 comprises "Seconds" resulting in the graph 500 displaying the amount of time it took each parser to parse through a particular amount of bytes. Data points 506, 508, 510 have been plotted for the three separate data series Parser A 512, Parser B 514, and Parser C 516 allowing a user to compare the performance of each parser.

One advantage of the present invention is that a graph including multiple data series such as the graph 500 in FIG. 5 can be created from raw data such as shown in the spreadsheet 202 in FIG. 2. A user is able to select a column(s) and its associated data to be used for plotting an x-axis and a y-axis for various data series selected by a user via a series identifier selection. The spreadsheet application 120 automatically identifies the various data series within the column(s) selected by a user for the series identifier and generates a graph including data points for each of these identified data series. A user is no longer required to arrange a spreadsheet to group rows of information together for a given data series. A user is also no longer required to separately add a data series with its x-y data range to a graph. The spreadsheet application 120 of the present invention automatically creates a graph including multiple data series based on the user selection for an x-axis, y-axis, optional filters, and a series identifier.

Exemplary Processing of Creating a Graph for Raw Data

Figure 6:
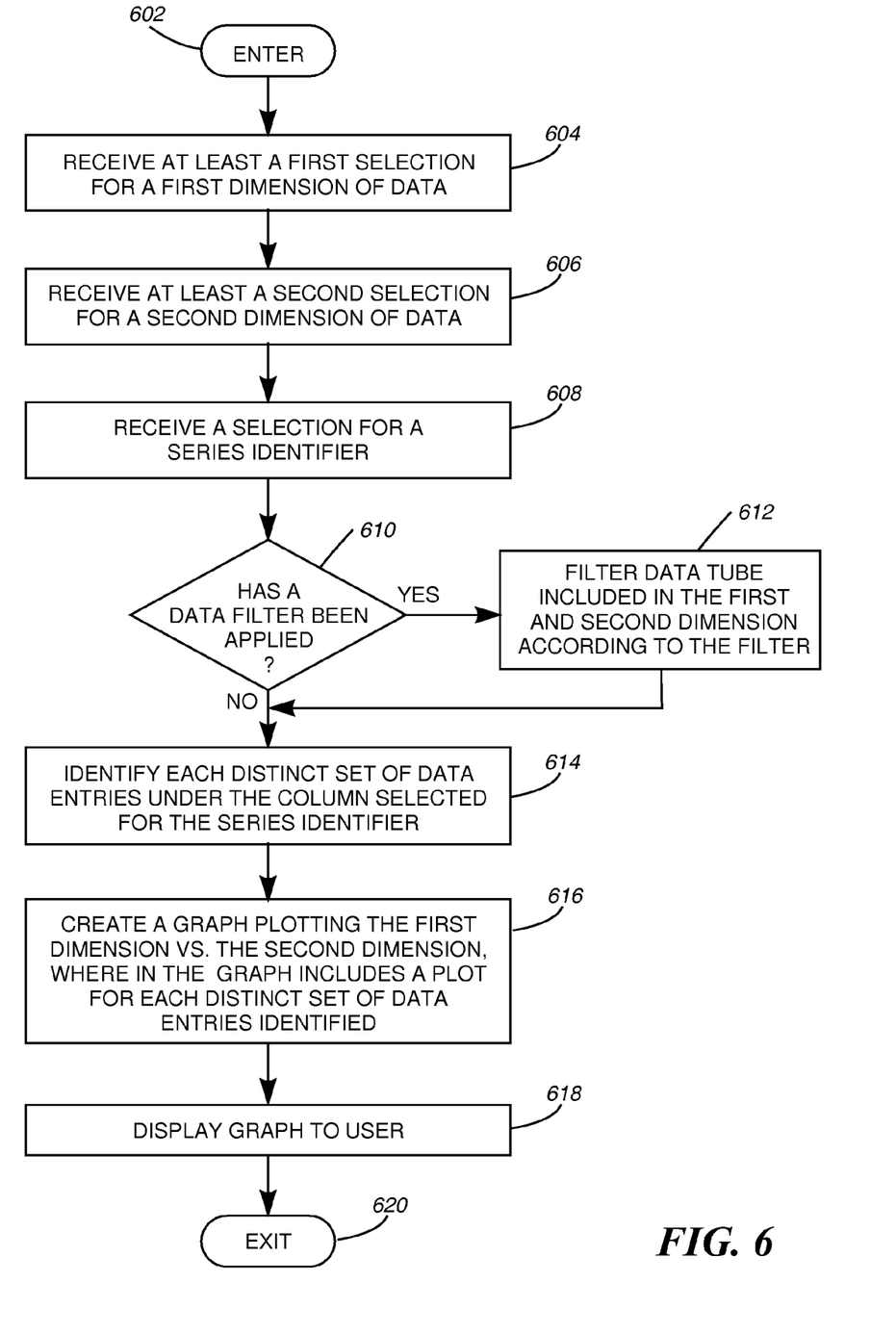
FIG. 6 is an operational flow diagram illustrating an exemplary process of creating a graph, for data in a non-series-relational format, including data plots for multiple data series according to an embodiment of the present invention.

FIG. 6 shows an exemplary process of creating a graph, which includes multiple data series, for data arranged in a format where data is not necessarily in a series relationship with data in adjacent cells. The operational flow diagram of FIG. 6 begins at step 602 and flows directly to step 604. The spreadsheet application 120, at step 604, receives at least a first selection for a first dimension of data. For example, using the user interface 128, the user can select one or more columns to be associated with an x-axis of a graph. The spreadsheet application 120, at step 606, receives at least a second selection for a second dimension of data. For example, using the user interface 128, the user can select one or more columns to be associated with a y-axis of a graph. The spreadsheet application 120, at step 608, receives a selection for a series identifier. For example, a user, through the user interface 128, selects a column or columns to be used for the data series of a graph.

The spreadsheet application 120, at step 610, determines if any optional data filters have been applied to the data of the columns selected by the user. If the result of this determination is positive, the data to be included in the first dimension and second dimension of a graph, at step 612, is filtered according to the selected filter(s). The control then flows to step 614. If the result of this determination is negative, the data series identifier 126, at step 614 identifies each distinct set of data entries within the column or columns selected by the user to be the series identifier. The identified distinct sets of data entries, in one embodiment, are to be the data series of associated data points plotted on the graph. The spreadsheet application 120, at step 616, creates a graph plotting the first dimension using data associated with the columns selected by the user versus the second dimension using data associated with the columns selected by the user. The graph includes data plots for each of the distinct sets of data entries identified by the data series identifier 126. The graph, at step 618, is displayed to the user. The control flow then exits at step 620.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with one embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with one embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program, logic, language, or instruction but may be practiced with any such suitable program, logic, language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for graphically representing data in a spreadsheet, the method comprising:
   displaying a set of tabular data visually arranged at least in rows and columns;
   receiving a user selection of a first dimension of data in a series, wherein the first dimension of data is visually included in a first column in the set of tabular data;
   receiving a user selection of a second dimension of data in the series, wherein the second dimension of data is visually included in a second column in the set of tabular data;
   receiving a user selection of at least one series identifier, wherein the at least one series identifier is visually included in a third column in the set of tabular data, and wherein the at least one series identifier is separate and distinct from a set of data under the third column;
   automatically finding, without manual intervention and in response to receiving the user selection of the at least one series identifier, a plurality of distinct sets of data entries within the third column, wherein each distinct set of data entries in the plurality of distinct sets identifies a separate data series in the tabular data comprising a plurality of entries within the first column and a plurality of entries in the second column, wherein each distinct set of data entries in the plurality of distinct sets of data entries is free from association with a separate data series identifier; and
   automatically creating, without manual intervention, a graphical representation of the user selected tabular data based on
      the selected first dimension of data in the series,
      the selected second dimension of data in the series, and
      the selected series identifier,
   wherein for each separate data series, the graphical representation includes a data point at an intersection of the first dimension of data and the second dimension of data, data values of the first dimension of data and the second dimension of data being found at respective first and second intersections of a row in the visually arranged tabular data intersecting with the first column and the second column, and further wherein the selected series identifier is found at the intersection of the row and the third column.

2. The method of claim 1, wherein the receiving the user selection of the first dimension of data in the series further comprises:
   receiving a column identifier associated with the first column, wherein the column identifier is at least one of entered by a user in an input box and selected with a pointing device, wherein the column identifier is visually included in the first column.

3. The method of claim 1, wherein the receiving the user selection of the first dimension of data in the series further comprises:
   receiving at least one expression created by a user, the at least one expression comprising at least a first column identifier associated with the first column and at least a second column identifier associated with the second column.

4. The method of claim 1, wherein the receiving the user selection of the second dimension of data in the series further comprises:
receiving a column identifier associated with the second column, wherein the column identifier is at least one of entered by a user in an input box and selected with a pointing device, wherein the column identifier is visually included in the second column.

5. The method of claim 1, wherein the receiving the user selection of the second dimension of data in the series further comprises:
receiving at least one expression created by a user, the at least one expression comprising at least a first column identifier associated with first column and at least a second column identifier associated with the second column.

6. The method of claim 1, wherein the receiving the user selection of the at least one series identifier further comprises:
receiving a column identifier associated with the third column, wherein the column identifier is at least one of entered by a user in an input box and selected with a pointing device, wherein the column identifier is visually included in the third column.

7. The method of claim 1, wherein the receiving the user selection of the at least one series identifier further comprises:
receiving at least one expression created by a user, the at least one expression comprising at least a first column identifier associated with the third column and at least a second column identifier associated with a fourth column.

8. The method of claim 1, further comprising:
receiving a user selection of at least one filter associated with at least one of the first dimension of data, the second dimension of data, and the at least one series identifier.

9. The method of claim 8, wherein the receiving the user selection of the at least one filter further comprises at least one of:
receiving a user selection of a predefined filter; and
receiving at least one filter expression entered by a user.

10. The method of claim 8, wherein the automatically creating is further based on:
the at least one filter.

11. The method of claim 1, wherein the graphical representation of the user selected tabular data is one of a two-dimensional graphical representation and a three-dimensional graphical representation.

12. The method of claim 1, wherein at least one of the first dimension of data, the second dimension of data, and the at least one series identifier are selected from at least two separate columns.

13. An information processing system, the information processing system comprising:
a memory;
a processor communicatively coupled to the memory;
a spreadsheet module communicatively coupled to the memory and the processor; and
a spreadsheet user interface communicatively coupled to the spreadsheet module, wherein the spreadsheet user interface module is configured to perform a method comprising:
displaying a set of tabular data visually arranged at least in rows and columns;
receiving a user selection of a first dimension of data in a series, wherein the first dimension of data is visually included in a first column in the set of tabular data;
receiving a user selection of at least one series identifier, wherein the at least one series identifier is visually included in a third column in the set of tabular data;
receiving a user selection of at least one series identifier, wherein the at least one series identifier is visually included in a third column in the set of tabular data, the user selection comprising only a column identifier associated with the third column, and wherein the at least one series identifier is separate and distinct from a set of data under the third column;
automatically finding, without manual intervention and in response to receiving the user selection of the at least one series identifier, each distinct set of data entries within the third column, wherein each distinct set of data entries identifies a separate data series in the tabular data comprising a plurality of entries within the first column and a plurality of entries in the second column, wherein each distinct set of data entries in the plurality of distinct sets of data entries is free from association with a separate data series identifier; and
automatically creating, without manual intervention, a graphical representation of the user selected tabular data based on
the selected first dimension of data in the series,
the selected second dimension of data in the series, and
the selected series identifier,
the automatically creating further comprising independently plotting each of the separate data series against the first dimension and the second dimension.

14. The information processing system of claim 13, further comprising:
receiving a user selection of at least one filter associated with at least one of the first dimension of data, the second dimension of data, and the at least one series identifier, wherein the receiving the user selection of the at least one filter further comprises at least one of:
receiving a user selection of a predefined filter; and
receiving at least one filter expression entered by a user.

15. The information processing system of claim 14, wherein the automatically creating is further based on:
the at least one filter.

16. The information processing system of claim 13, wherein at least one of the first dimension of data, the second dimension of data, and the at least one series identifier are selected from at least two separate columns.

17. A non-transitory computer readable medium for graphically representing data in a spreadsheet, the computer readable medium comprising instructions for:
displaying a set of tabular data visually arranged at least in rows and columns;
receiving a user selection of a first dimension of data in a series, wherein the first dimension of data is visually included in a first column in the set of tabular data;
receiving a user selection of a second dimension of data in the series, wherein the second dimension of data is visually included in a second column in the set of tabular data;
receiving a user selection of at least one series identifier, wherein the at least one series identifier is visually included in a third column in the set of tabular data, and wherein the at least one series identifier is separate and distinct from a set of data under the third column;

automatically finding, without manual intervention and in response to receiving the user selection of the at least one series identifier, a plurality of distinct sets of data entries within the third column, wherein each distinct set of data entries in the plurality of distinct sets identifies a separate data series in the tabular data comprising a plurality of entries within the first column and a plurality of entries in the second column, wherein each distinct set of data entries in the plurality of distinct sets of data entries is free from association with a separate data series identifier; and automatically creating, without manual intervention, a graphical representation of the user selected tabular data based on
  the selected first dimension of data in the series,
  the selected second dimension of data in the series, and
  the selected series identifier, wherein for each separate data series, the graphical representation includes a data point at an intersection of the first dimension of data and the second dimension of data, data values of the first dimension of data and the second dimension of data being found at respective first and second intersections of a row in the visually arranged tabular data intersecting with the first column and the second column, and further wherein the selected series identifier is found at the intersection of the row and the third column.

18. The non-transitory computer readable medium of claim 17, further comprising instructions for:
  receiving a user selection of at least one filter associated with at least one of the first dimension of data, the second dimension of data, and the at least one series identifier, wherein the instructions for receiving the user selection of the at least one filter further comprises at least one of:
  receiving a user selection of a predefined filter; and
  receiving at least one filter expression entered by a user.

19. The non-transitory computer readable medium of claim 17, wherein the automatically creating is further based on:
  the at least one filter.

20. The non-transitory computer readable medium of claim 17, wherein at least one of the first dimension of data, the second dimension of data, and the at least one series identifier are selected from at least two separate columns.

\* \* \* \* \*